UNITED STATES PATENT OFFICE.

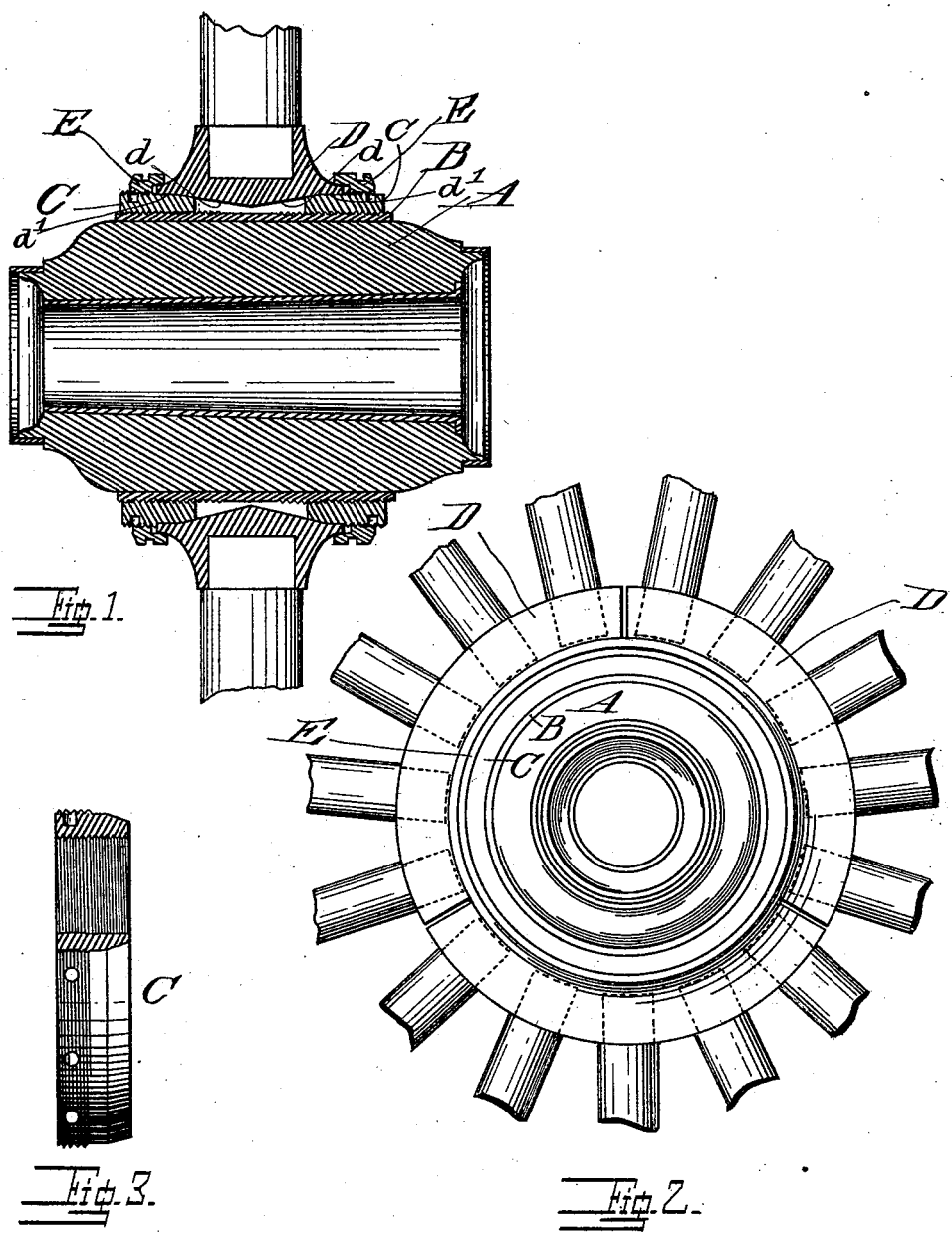

THADDIEUS S. FIELD, OF ATLANTA, GEORGIA, ASSIGNOR OF ONE-HALF TO GEORGE W. DUNN, OF SAME PLACE.

WHEEL-HUB.

SPECIFICATION forming part of Letters Patent No. 517,216, dated March 27, 1894.

Application filed August 8, 1893. Serial No. 482,692. (No model.)

*To all whom it may concern:*

Be it known that I, THADDIEUS S. FIELD, a subject of the Queen of Great Britain, and a resident of Atlanta, in the county of Fulton and State of Georgia, have made a certain new and useful Improvement in Wheel-Hubs; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention as above stated relates to hubs for vehicle wheels, the object of the invention being to construct a wheel in which the felly may be expanded or reduced in size to provide the proper frictional contact therewith of the tire during dry or wet weather, the invention consisting of certain details of construction hereinafter described and the novel elements thereof as set up in the claims.

In the accompanying drawings—Figure 1 is a longitudinal section of a hub, showing this device applied to a wooden center. Fig. 2 is an end view of the hub showing the severed expansible ring. Fig. 3 is a detail of the tapered wedge ring, a portion thereof being broken away to show the interior of same.

In the figures like reference marks indicate corresponding elements in all the views.

A is the core or hub center, which may be of any desired form or material so long as it is capable of receiving and holding the sleeve B, which fits thereon, and is exteriorly screw-threaded at its ends and for a considerable distance thereon. Wedge-rings C tapered on their outer peripheral surface at their contiguous or inner ends, internally screw-threaded and provided with spanner-holes, are screwed onto the exterior screw-threaded portion of the sleeve B.

D are segments which when assembled form a ring, which is adapted to receive in its outer periphery the tenons on the inner ends of the spokes, sockets of suitable form and character being formed for such purpose. The inner side of this ring is provided with beveled faces $d$ which rest on the bevel on the inner ends of the wedge rings C. The inner side of the ring formed of these segments D has also a cylindrical portion on each end as shown in Fig. 1, at $d'$ therein, which said cylindrical portions limit the reduction in size of the ring in unscrewing the rings C; said cylindrical faces $d'$ coming into contact with the cylindrical peripheral surface of the rings C, after which said rings may be turned a considerable number of revolutions after the compression ceases before said ring will disintegrate. This insures that the rings C may be completely withdrawn from any contact with the segments that would tend to expand the latter without danger of accidental releasing of the said segments. Rings E may be screwed over the rings C, engaging the edges of the segments D and so preventing dishing under extraordinary strains.

The operation of this device is as follows: In making up a wheel with this hub, the fellies are cut to fit the tire and bored to receive the spokes in the ordinary manner. The hub is set on a suitable center pin concentrically with the said tire, said hub having the top one of the rings C removed. The spokes are inserted in the felly all around, and their inner ends are then set in the segments D in order, which segments are then slipped down over the sleeve B forming a ring, being allowed to descend until they come into contact with the ring C remaining on the sleeve B. The ring C which was removed is then screwed into place and the wheel tightened to the sufficient rigidity by the use of a spanner, on the rings C, each ring being screwed up alike. To take out a broken spoke the ring C on the convex side of the wheel is removed, the segment slipped up which contains the inner end of the broken spoke, said spoke is removed and another inserted in its place, after which the segment is put back into its place, and the ring C replaced, tightening all spokes alike. It is plain that none of these operations require more than ordinary care, and hence that an ordinary man without tools can make or repair the wheel.

Having thus described my invention, what I claim as new, and desire to secure by Letters Patent of the United States of America, is—

1. In a wheel-hub, an exteriorly screw-threaded sleeve secured on the hub proper, wedge-rings having tapered inner ends and being screwed onto said sleeve, and a severed ring seated between said wedge rings resting upon the tapered end portions thereof and being provided on its outer surface for the reception of the spoke tenons, substantially as and for the purpose specified.

2. In a wheel-hub, an exteriorly screw-threaded sleeve secured on the hub proper, wedge-rings having tapered inner ends and being screwed onto said sleeve, and a severed ring flared from its center outwardly larger, provided with cylindrical portions $d'$ and seated between said wedge rings and resting upon the tapered end portions thereof and being provided on its outer surface with sockets for the reception of the spoke-tenons, substantially as and for the purpose specified.

In testimony whereof I hereunto affix my signature in presence of two witnesses.

THADDIEUS S. FIELD.

Witnesses:
A. P. WOOD,
EDWARD P. WOOD.